US011135965B2

(12) United States Patent
Fukunaga et al.

(10) Patent No.: US 11,135,965 B2
(45) Date of Patent: Oct. 5, 2021

(54) OPTICAL AXIS CONTROL APPARATUS FOR HEADLIGHT

(71) Applicant: MITSUBISHI ELECTRIC CORPORATION, Tokyo (JP)

(72) Inventors: Takao Fukunaga, Tokyo (JP); Wataru Tsujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 16/094,059

(22) PCT Filed: May 31, 2016

(86) PCT No.: PCT/JP2016/065979
§ 371 (c)(1),
(2) Date: Oct. 16, 2018

(87) PCT Pub. No.: WO2017/208327
PCT Pub. Date: Dec. 7, 2017

(65) Prior Publication Data
US 2020/0324686 A1 Oct. 15, 2020

(51) Int. Cl.
*B60Q 1/115* (2006.01)
*F21S 41/657* (2018.01)

(52) U.S. Cl.
CPC ............ *B60Q 1/115* (2013.01); *F21S 41/657* (2018.01); *B60Q 2300/136* (2013.01)

(58) Field of Classification Search
CPC ............. B60Q 1/115; B60Q 2300/136; B60Q 2300/13; B60Q 2300/132; F21S 41/657;
(Continued)

(56) References Cited

U.S. PATENT DOCUMENTS

2015/0291082 A1 10/2015 Kasaba et al.

FOREIGN PATENT DOCUMENTS

| JP | 2014-104788 A | 6/2014 |
| JP | 2014104788 A * | 6/2014 |
| JP | 2015-202757 A | 11/2015 |

OTHER PUBLICATIONS

Machine translation of JP-2014104788-A, retrieved from worldwide.espacenet.com on Mar. 10, 2021 (Year: 2021).*

(Continued)

*Primary Examiner* — Rajarshi Chakraborty
*Assistant Examiner* — Steven Y Horikoshi
(74) *Attorney, Agent, or Firm* — Birch, Stewart, Kolasch & Birch, LLP

(57) ABSTRACT

An optical axis control apparatus includes: an optical axis controlling unit for calculating, during stop of the vehicle, a pitch angle using an acceleration sensor provided in a vehicle and controlling, using the pitch angle, optical axis angles of headlights provided in the vehicle; and a rolling motion determination unit for determining, when the vehicle has started traveling, whether there has been a rolling motion during the stop of the vehicle. When the pitch angle has been changed during the stop of the vehicle and the rolling motion determination unit determines that the rolling motion exists, the optical axis controlling unit corrects, when the vehicle has started traveling and the rolling motion has been terminated, the amount change in pitch angle, using the amounts of correction set for each roll angle, and controls the optical axis angles using the corrected pitch angle.

6 Claims, 8 Drawing Sheets

(58) Field of Classification Search
CPC ......... B60W 2520/04; B60W 2520/16; B60W 2520/18; B60W 40/11; B60W 40/112
See application file for complete search history.

(56) References Cited

OTHER PUBLICATIONS

Mingjun., "Research on Headlamp Rotation Angle Control Methods for Automotive AFS Based on Dynamic Light Distribution." Chinese Excellent MAsterchar(39)s Degree Thesis Full-Text Database Engineering Technology II, No. 12, Dec. 15, 2015, pp. 21-28, with English translation (Year: 2015).*
International Search Report, issued in PCT/JP2016/065979, dated Aug. 16, 2016.
Chinese Office Action and Search Report for Chinese Application No. 201680085954.4, dated May 8, 2021, with English translation.
Mingjun., "Research on Headlamp Rotation Angle Control Methods for Automotive AFS Based on Dynamic Light Distribution", Chinese Excellent Masterchar(39)s Degree Thesis Full-Text Database Engineering Technology II, No. 12, Dec. 15, 2015, pp. 21-28, with English translation.

* cited by examiner

FIG. 4A

| Vehicle Type | Roll Angle Relative To Horizontal Plane θR Obtained During Stop | Amount Of Correction θC For Pitch Angle Relative To Road Surface θP2 |
|---|---|---|
| Passenger Car (Minivan) | +3° (Left Side Up) | −0.6° (Correction In Depression Direction) |
| | +2° (Left Side Up) | −0.4° (Correction In Depression Direction) |
| | +1° (Left Side Up) | −0.2° (Correction In Depression Direction) |
| | ±0° (No Rolling Motion) | ±0.0° (No Correction) |
| | −1° (Right Side Up) | +0.2° (Correction In Elevation Direction) |
| | −2° (Right Side Up) | +0.4° (Correction In Elevation Direction) |
| | −3° (Right Side Up) | +0.6° (Correction In Elevation Direction) |

FIG. 4B

| Vehicle Type | Roll Angle Relative To Horizontal Plane θR Obtained During Stop | Amount Of Correction θC For Pitch Angle Relative To Road Surface θP2 |
|---|---|---|
| Passenger Car (Other Than Minivan) | +3° (Left Side Up) | −0.3° (Correction In Depression Direction) |
| | +2° (Left Side Up) | −0.2° (Correction In Depression Direction) |
| | +1° (Left Side Up) | −0.1° (Correction In Depression Direction) |
| | ±0° (No Rolling Motion) | ±0.0° (No Correction) |
| | −1° (Right Side Up) | +0.1° (Correction In Elevation Direction) |
| | −2° (Right Side Up) | +0.2° (Correction In Elevation Direction) |
| | −3° (Right Side Up) | +0.3° (Correction In Elevation Direction) |

FIG. 4C

| Vehicle Type | Roll Angle Relative To Horizontal Plane θR Obtained During Stop | Amount Of Correction θC For Pitch Angle Relative To Road Surface θP2 |
|---|---|---|
| Truck | +3° (Left Side Up) | −0.9° (Correction In Depression Direction) |
| | +2° (Left Side Up) | −0.6° (Correction In Depression Direction) |
| | +1° (Left Side Up) | −0.3° (Correction In Depression Direction) |
| | ±0° (No Rolling Motion) | ±0.0° (No Correction) |
| | −1° (Right Side Up) | +0.3° (Correction In Elevation Direction) |
| | −2° (Right Side Up) | +0.6° (Correction In Elevation Direction) |
| | −3° (Right Side Up) | +0.9° (Correction In Elevation Direction) |

OPTICAL AXIS CONTROL APPARATUS FOR HEADLIGHT

TECHNICAL FIELD

The present disclosure relates to optical axis control apparatuses for headlight.

BACKGROUND ART

In general, inclination in a front-rear direction of the body of a vehicle relative to the road surface or the horizontal plane is referred to as "pitch". Hereinafter, the angle of pitch relative to road surface is referred to as "pitch angle relative to road surface", and the angle of pitch relative to horizontal plane is referred to as "pitch angle relative to horizontal plane". The pitch angle relative to road surface and the pitch angle relative to horizontal plane may be collectively referred to as "pitch angle" simply. The pitch angle relative to horizontal plane is represented by a total value of the pitch angle relative to road surface and the inclination angle in a front-rear direction of the road surface relative to horizontal plane (hereinafter, referred to as "grade angle of road surface").

Likewise, inclination in a left-right direction of the body of the vehicle relative to the road surface or horizontal plane is referred to as "rolling motion". The angle of roll relative to road surface is hereinafter referred to as "roll angle relative to road surface", and the angle of roll relative to horizontal plane is hereinafter referred to as "roll angle relative to horizontal plane". The roll angle relative to road surface and the roll angle relative to horizontal plane may be collectively referred to as "roll angle" simply.

Conventionally, there is developed a control device, a so-called "auto levelizer" or "auto leveling unit". The control device calculates a pitch angle by using output values from an acceleration sensor provided for a vehicle, and performs control, using the pitch angle, such that the optical axis angles of headlights relative to a road surface (hereinafter, simply referred to as "optical axis angles") are substantially constant at a target value.

For example, a control device of Patent Literature 1 calculates a pitch angle relative to horizontal plane by using an acceleration in a front-rear direction of a vehicle and an acceleration in an up-down direction of the vehicle. When the pitch angle relative to horizontal plane is changed during traveling of the vehicle, the control device estimates the change is due to a change in the grade angle of road surface, and when the pitch angle relative to horizontal plane is changed during a stop of the vehicle, the control device estimates the change is due to a change in pitch angle relative to road surface. The control device calculates a pitch angle relative to road surface by subtracting the grade angle of road surface from the pitch angle relative to horizontal plane, and controls the optical axis angles of headlights on the basis of the pitch angle relative to road surface.

Here, in a state in which the roll angle has non zero value when detecting acceleration, accelerations in the front-rear direction and up-down direction of the vehicle detected by the acceleration sensor include a component of an acceleration in a left-right direction of the vehicle. Hence, a pitch angle calculated using these accelerations has an error with respect to the actual pitch angle. Due to the error, there is a problem in that an optical axis angle controlled by the auto levelizer is more depressed than a target value, causing the range of light irradiation by a headlight to be narrower, or in that an optical axis angle controlled by the auto levelizer is more elevated than a target value, causing a headlight light to blind a driver of an oncoming vehicle or annoy a pedestrian.

Regarding the problem, a control device of Patent Literature 2 calculates the amount of correction Mc shown in Equation (1) below, with G being a gravitational acceleration and y being an acceleration in a left-right direction of a vehicle detected by an acceleration sensor. The control device corrects an acceleration z in an up-down direction detected by the acceleration sensor, using the amount of correction Mc. By this, a component of the acceleration y in the left-right direction included in the acceleration z in the up-down direction is corrected, by which an error in a pitch angle is reduced.

$$Mc = G - \sqrt{(G^2 - y^2)} \tag{1}$$

CITATION LIST

Patent Literatures

Patent Literature 1: JP 2015-202757 A
Patent Literature 2: JP 2014-104788 A

SUMMARY OF INVENTION

Technical Problem

For example, the amount of change in pitch angle for when a piece of baggage I is loaded in a trunk provided at the rear of a vehicle 1 has different values for a state in which a rolling motion occurs due to a left front wheel portion running over a curb II as shown in FIG. 11, and for a state in which no rolling motion occurs as shown in FIG. 12, even with the same piece of baggage I, due to the stretch and contraction characteristics of suspension devices provided in respective wheel portions of the vehicle, etc., as will be described later. Therefore, in a state in which the roll angle has non zero value during stop of a vehicle, if the vehicle starts traveling and the rolling motion disappears to change the roll angle, the pitch angle changes accordingly. With a configuration in which the amount of correction is calculated using output values from the acceleration sensor as in the control device of Patent Literature 2, the amount of change in pitch angle that depends on the stretch or compression of the suspension devices upon disappearance of the rolling motion cannot be corrected. Hence, there is a problem in that, after the vehicle starts traveling, an error occurs between an optical axis angle controlled by the auto levelizer and a target value.

Moreover, the configuration in which the amount of correction is calculated using output values from the acceleration sensor as in the control device of Patent Literature 2 has a problem of an increase in processing load because the amount of correction is calculated. Furthermore, the configuration has a problem of a further increase in processing load because the amount of correction is calculated regardless of whether there is a rolling motion, to correct an acceleration.

One or more embodiments in the present disclosure are made to solve problems such as those described above, and an object of the one or more embodiments is to provide an optical axis control apparatus for headlight capable of reducing processing load while correcting the amount of change in pitch angle caused by a roll angle, with high accuracy.

Solution To Problem

An optical axis control apparatus for headlight according to the present disclosure includes: an optical axis controlling unit for calculating, during stop of the vehicle, a pitch angle by using output values from an acceleration sensor provided for a vehicle, and controlling an optical axis angle of a headlight provided for the vehicle by using the pitch angle; and a rolling motion determination unit for determining, when the vehicle starts traveling, whether there is a rolling motion during the stop of the vehicle, wherein when the pitch angle is changed during the stop of the vehicle and the rolling motion determination unit determines an existence of the rolling motion, the optical axis controlling unit corrects, upon disappearance of the rolling motion, the changed pitch angle by using an amount of correction set for each roll angle during stop of the vehicle, and controls the optical axis angle by using the corrected pitch angle.

Advantageous Effects of Invention

Since the optical axis control apparatus for headlight according to the present disclosure is configured in the above-described manner, processing load can be reduced while the amount of change in pitch angle caused by a roll angle is corrected with high accuracy.

BRIEF DESCRIPTION OF DRAWINGS

FIGS. 4A-4C are illustrative diagrams showing examples of the amount of correction according to Embodiment 1 in the present disclosure.

DESCRIPTION OF EMBODIMENTS

To describe this application in more detail, embodiments according to the disclosure will be described below with reference to the accompanying drawings.

Embodiment 1

Figure 1:
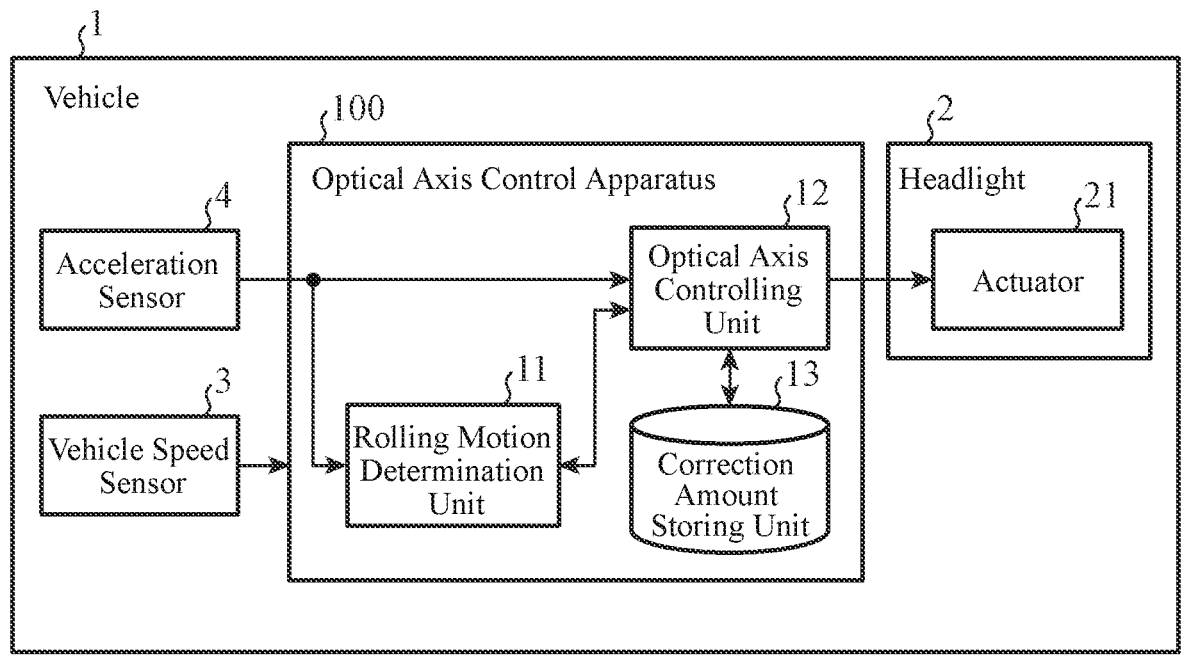
FIG. 1 is a functional block diagram showing main part of an optical axis control apparatus according to Embodiment 1 in the present disclosure.
Figure 2:
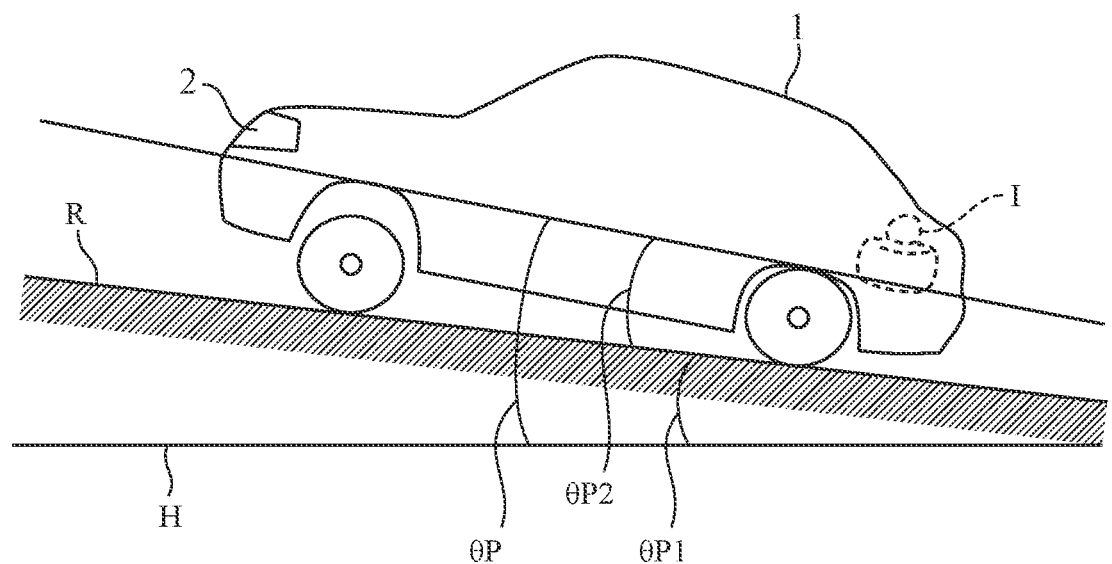
FIG. 2 is an illustrative diagram showing examples of pitch angles and a grade angle of road surface.
Figure 3:
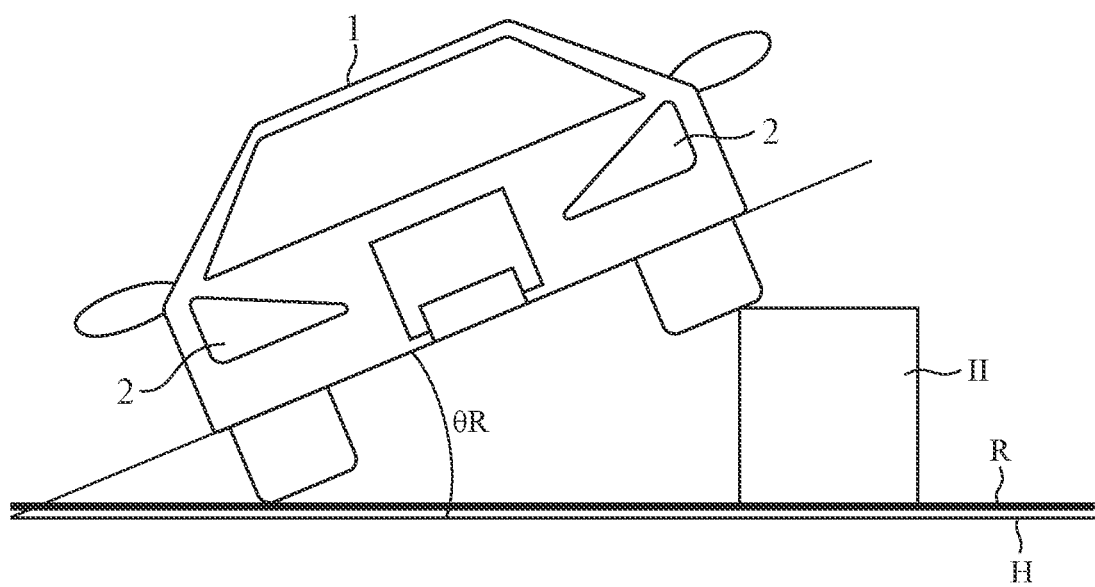
FIG. 3 is an illustrative diagram showing an example of a roll angle.
Figure 5:
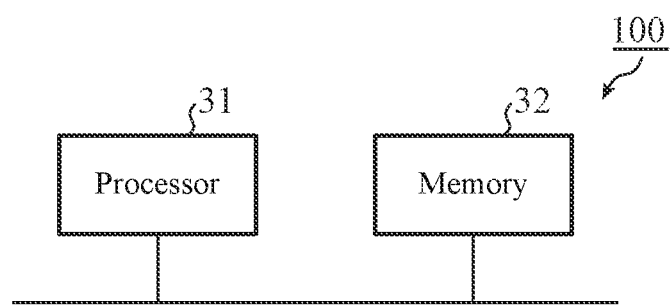
FIG. 5 is a hardware configuration diagram showing main part of the optical axis control apparatus according to Embodiment 1 in the present disclosure.
Figure 6:
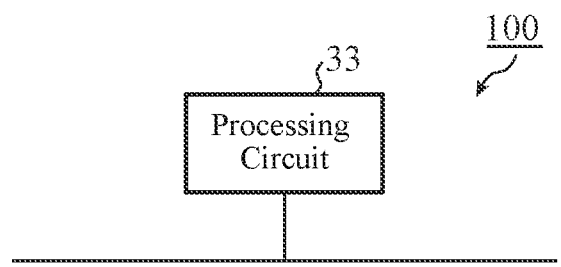
FIG. 6 is another hardware configuration diagram showing a main part of the optical axis control apparatus according to Embodiment 1 in the present disclosure.

FIG. 1 is a functional block diagram showing main part of an optical axis control apparatus according to Embodiment 1 in the present disclosure. FIG. 2 is an illustrative diagram showing examples of pitch angles and a grade angle of road surface. FIG. 3 is an illustrative diagram showing an example of a roll angle. FIG. 4 is illustrative diagrams showing examples of the amount of correction according to Embodiment 1 in the present disclosure. FIG. 5 is a hardware configuration diagram showing main part of the optical axis control apparatus according to Embodiment 1 in the present disclosure. FIG. 6 is another hardware configuration diagram showing main part of the optical axis control apparatus according to Embodiment 1 in the present disclosure. With reference to FIGS. 1 to 6, an example in which an optical axis control apparatus 100 according to Embodiment 1 is mounted on a vehicle 1 which is a four-wheel drive vehicle will be mainly described.

Headlights 2 are provided in the body of the vehicle 1. Specifically, for example, a pair of headlights 2 is disposed on the left and right front end portions of the vehicle body. Each headlight 2 includes a light source, which is not shown, and an actuator 21 that causes the light source to pivot in an up-down direction. By the operation of the actuator 21, the optical axis angle of the headlight 2 can be changed.

A vehicle speed sensor 3 is provided in a wheel portion or a drive shaft of the vehicle 1, and is to output a pulse signal based on the rotational speed of a wheel, a so-called "vehicle speed signal". The vehicle speed signal is used by the optical axis control apparatus 100 to, for example, determine whether the vehicle 1 is stationary and determine whether the vehicle 1 starts traveling.

An acceleration sensor 4 is provided in the vehicle body of the vehicle 1, and is composed of a so-called "3-axis" acceleration sensor. Namely, the acceleration sensor 4 is to detect an acceleration Gx in a front-rear direction of the body of the vehicle 1, an acceleration Gy in a left-right direction of the body of the vehicle 1, and an acceleration Gz in an up-down direction of the body of the vehicle 1, and output these detected values to the optical axis control apparatus 100. The output values from the acceleration sensor 4 are used by the optical axis control apparatus 100 to, for example, calculate a pitch angle relative to horizontal plane $\theta P$ and calculate a roll angle relative to horizontal plane $\theta R$.

FIG. 2 shows examples of a grade angle of road surface $\theta P1$, a pitch angle relative to road surface $\theta P2$, and a pitch angle relative to horizontal plane $\theta P$. As shown in FIG. 2, a road surface R is uphill. In addition, a piece of baggage I is loaded in a trunk of the vehicle 1, and the vehicle 1 leans backward due to the load of the baggage I. As shown in FIG. 2, the pitch angle relative to horizontal plane $\theta P$ relative to the horizontal plane H is represented by a total value of the grade angle of road surface $\theta P1$ and the pitch angle relative to road surface $\theta P2$.

FIG. 3 shows an example of a roll angle relative to horizontal plane $\theta R$. As shown in FIG. 3, a left front wheel of the vehicle 1 is on a curb II, and thus the vehicle 1 is in a state in which its left side is lifted. In the example of FIG. 3, a road surface R is substantially parallel to a horizontal plane H, and a roll angle relative to road surface (not shown) has a value equal to the roll angle relative to horizontal plane θR.

A rolling motion determination unit 11 is to calculate, during stop of the vehicle 1, a roll angle relative to horizontal plane θR of the vehicle 1, using the accelerations Gy and Gz outputted from the acceleration sensor 4. The roll angle relative to horizontal plane θR is calculated by, for example, Equation (2) below:

$$\theta R = \tan^{-1}(Gy/Gz) \qquad (2)$$

The rolling motion determination unit 11 is to determine, when the vehicle 1 starts traveling, whether there is a rolling motion during the stop of the vehicle 1, using the roll angle relative to horizontal plane θR calculated during the stop of the vehicle 1. Specifically, for example, it is assumed that the roll angle relative to horizontal plane θR for a state in which the body of the vehicle 1 is horizontal is set to zero value, the roll angle relative to horizontal plane θR for a state in which the left side of the body is lifted is set to take a positive value, and the roll angle relative to horizontal plane θR for a state in which the right side of the body is lifted is set to take a negative value. In the rolling motion determination unit 11, a first threshold value which is a positive value and a second threshold value which is a negative value are preset. When the roll angle relative to horizontal plane θR has a value greater than or equal to the first threshold value or when the roll angle relative to horizontal plane θR has a value less than or equal to the second threshold value, the rolling motion determination unit 11 determines that there is a rolling motion. When the roll angle relative to horizontal plane θR has a value between the first and second threshold values, the rolling motion determination unit 11 determines that there is no rolling motion.

The rolling motion determination unit 11 is to output a determination result to an optical axis controlling unit 12. In addition, the rolling motion determination unit 11 is to output, when determining that there is a rolling motion during the stop of the vehicle 1, a roll angle relative to horizontal plane θR which is calculated during the stop of the vehicle 1, to the optical axis controlling unit 12.

The optical axis controlling unit 12 is to calculate, during the stop of the vehicle 1, a pitch angle relative to horizontal plane θP of the vehicle 1, using accelerations Gx and Gz outputted from the acceleration sensor 4. The pitch angle relative to horizontal plane θP is calculated according to, for example, Equation (3) below:

$$\theta P = \tan^{-1}(Gx/Gz) \qquad (3)$$

The optical axis controlling unit 12 repeatedly calculates, during the stop of the vehicle 1, a pitch angle relative to horizontal plane θP, and thereby calculates the amount of change ΔθP in pitch angle relative to horizontal plane θP. The optical axis controlling unit 12 considers the amount of change ΔθP to be the amount of change in pitch angle relative to road surface θP2, and adds the amount of change ΔθP to a pitch angle relative to road surface θP2 that is calculated last time (when not calculated, a preset reference value), and thereby calculates a new pitch angle relative to road surface θP2. The optical axis controlling unit 12 controls the optical axis angles of the headlights 2 on the basis of the new pitch angle relative to road surface θP2. Specifically, the optical axis controlling unit 12 allows each actuator 21 to operate such that the optical axis angles of the headlights 2 approach a preset target value.

The above-described processes performed by the optical axis controlling unit 12 during the stop of the vehicle 1 may be hereinafter collectively referred to as "process to be performed during stop".

The optical axis controlling unit 12 is to calculate, during traveling of the vehicle 1, a pitch angle relative to horizontal plane θP using the same equation as Eq. (3) above. The optical axis controlling unit 12 repeatedly calculates, during the traveling of the vehicle 1, a pitch angle relative to horizontal plane θP, and thereby calculates the amount of change ΔθP in pitch angle relative to horizontal plane θP. The optical axis controlling unit 12 considers the amount of change ΔθP to be the amount of change in the grade angle of road surface θP1, and adds the amount of change ΔθP to a grade angle of road surface θP1 that is calculated last time (when not calculated, a preset reference value), and thereby calculates a new grade angle of road surface θP1. The optical axis controlling unit 12 subtracts the new grade angle θP1 of the road surface from a pitch angle relative to road surface θP2 that is calculated last time (when not calculated, a preset reference value), and thereby calculates a new pitch angle relative to road surface θP2. The optical axis controlling unit 12 controls the optical axis angles of the headlights 2 on the basis of the new pitch angle relative to road surface θP2. Specifically, the optical axis controlling unit 12 allows each actuator 21 to operate such that the optical axis angles of the headlights 2 approach a preset target value.

The above-described processes performed by the optical axis controlling unit 12 during the traveling of the vehicle 1 may be hereinafter collectively referred to as "process to be performed during traveling".

The optical axis controlling unit 12 is configured to obtain a determination result obtained by the rolling motion determination unit 11, when the vehicle 1 starts traveling. When there is rolling during stop of the vehicle 1, the optical axis controlling unit 12 is configured to obtain a roll angle relative to horizontal plane θR calculated during the stop from the rolling motion determination unit 11, and perform the following process (hereinafter, referred to as "correction process") prior to a process to be performed during traveling.

Namely, the optical axis controlling unit 12 determines whether the rolling of the vehicle 1 is disappeared, by calculating a roll angle relative to horizontal plane θR by the same equation as Eq. (2) above. Specifically, for example, in the optical axis controlling unit 12, a first threshold value and a second threshold value which are the same as those of the rolling motion determination unit 11 are preset. When the roll angle relative to horizontal plane θR obtained after traveling is started has a value greater than or equal to the first threshold value or when the roll angle relative to horizontal plane θR obtained after traveling is started has a value less than or equal to the second threshold value, the optical axis controlling unit 12 determines that the vehicle 1 is still has a rolling. When the roll angle relative to horizontal plane θR obtained after traveling is started has a value between the first and second threshold values, the optical axis controlling unit 12 determines that the rolling is disappeared.

When the rolling of the vehicle 1 disappears, the optical axis controlling unit 12 obtains an amount of correction θC corresponding to the roll angle relative to horizontal plane θR that is calculated during the stop and obtained from the rolling motion determination unit 11, among a plurality of amounts of correction θC which are prestored in a correction amount storing unit 13. The optical axis controlling unit 12 corrects, using the amount of correction θC obtained from the correction amount storing unit 13, a pitch angle relative to road surface θP2 that is calculated most recently, i.e., the last pitch angle relative to road surface θP2 calculated in the process to be performed during stop. The optical axis controlling unit 12 controls the optical axis angles of the headlights 2 on the basis of the corrected pitch angle relative to road surface θP2. Specifically, the optical axis controlling unit 12 operates each actuator 21 in such a manner that the optical axis angles of the headlights 2 approach a preset target value. Then, the optical axis controlling unit 12 starts a process to be performed during traveling.

The correction amount storing unit 13 is to store the amounts of correction θC for pitch angles relative to road surface θP2. FIG. 4 shows examples of the amount of correction θC. In the examples of FIG. 4, the unit of angle is degree (°). In addition, in the examples of FIG. 4, the roll angles for the left side is up are set to take positive values, and the roll angles for the right side is up are set to take negative values. The pitch angles for pitching in an elevation direction are set to positive values, and the pitch angles for pitching in a depression direction are set to negative values.

As shown in FIG. 4, the amounts of correction θC are set for each roll angle relative to horizontal plane θR which is obtained during stop of the vehicle 1. The amounts of correction θC are, as shown in FIG. 4, prestored in a table-format data structure upon manufacturing the optical axis control apparatus 100, upon mounting the optical axis control apparatus 100 on the vehicle 1, upon manufacturing the vehicle 1, or the like.

Here, in the examples of FIG. 4, the amounts of correction θC are set for each vehicle type of the vehicle 1. Namely, when the vehicle type of the vehicle 1 is a so-called "minivan", the amounts of correction θC shown in FIG. 4A are stored in the correction amount storing unit 13. When the vehicle type of the vehicle 1 is a passenger car other than a minivan, the amounts of correction θC shown in FIG. 4B are stored in the correction amount storing unit 13. When the vehicle type of the vehicle 1 is a truck, the amounts of correction θC shown in FIG. 4C are stored in the correction amount storing unit 13.

For example, it is assumed that the vehicle type of the vehicle 1 is a minivan, that the roll angle relative to the horizontal plane θR calculated by the rolling motion determination unit 11 during stop of the vehicle 1 is +2°, and that the last pitch angle relative to road surface θP2 calculated in a process to be performed during stop by the optical axis controlling unit 12 is +2°. In this case, the optical axis controlling unit 12 adds the amount of correction θC (−0.4°) to the pitch angle relative to road surface θP2 (+2°), and controls the optical axis angles of the headlights 2 on the basis of a pitch angle relative to road surface θP2 (+1.6°) obtained after the addition. The addition is correction to the optical axis angles of the headlights 2 in the depression direction.

Alternatively, it is assumed that the vehicle type of the vehicle 1 is a minivan, that the roll angle relative to horizontal plane θR calculated by the rolling motion determination unit 11 during stop of the vehicle 1 is −2°, and that the last pitch angle relative to road surface θP2 calculated in a process to be performed during stop by the optical axis controlling unit 12 is +2°. In this case, the optical axis controlling unit 12 adds the amount of correction θC (+0.4°) to the pitch angle relative to road surface θP2 (+2°), and controls the optical axis angles of the headlights 2 on the basis of a pitch angle relative to the road surface θP2 (+2.4°) obtained after the addition. The addition is correction to the optical axis angles of the headlights 2 in the elevation direction.

The rolling motion determination unit 11, the optical axis controlling unit 12, and the correction amount storing unit 13 constitute main part of the optical axis control apparatus 100.

FIG. 5 shows an example of a hardware configuration of the optical axis control apparatus 100. As shown in FIG. 5, the optical axis control apparatus 100 is implemented as a computer, and includes a processor 31 and a memory 32. The correction amount storing unit 13 shown in FIG. 1 is implemented by the memory 32. In addition, in the memory 32 is stored a program for causing the computer to function as the rolling motion determination unit 11 and the optical axis controlling unit 12 shown in FIG. 1. By the processor 31 reading and executing the program stored in the memory 32, the functions of the rolling motion determination unit 11 and the optical axis controlling unit 12 shown in FIG. 1 are implemented.

The processor 31 includes, for example, a central processing unit (CPU), a digital signal processor (DSP), a microcontroller, a microprocessor, or the like. The memory 32 includes, for example, a semiconductor memory such as a random access memory (RAM), a read only memory (ROM), a flash memory, an erasable programmable read only memory (EPROM), or an electrically erasable programmable read-only memory (EEPROM).

FIG. 6 shows another example of a hardware configuration of the optical axis control apparatus 100. As shown in FIG. 6, the optical axis control apparatus 100 is implemented as a dedicated processing circuit 33. The processing circuit 33 is, for example, an application specific integrated circuit (ASIC), a field-programmable gate array (FPGA), a system large-scale integration (LSI), or a combination thereof.

Note that each of the functions of the rolling motion determination unit 11, the optical axis controlling unit 12, and the correction amount storing unit 13 shown in FIG. 1 may be implemented by the processing circuit 33, or the functions of the respective units may be all together implemented by the processing circuit 33. In addition, some of the functions of the rolling motion determination unit 11, the optical axis controlling unit 12, and the correction amount storing unit 13 shown in FIG. 1 may be implemented by the processor 31 and the memory 32 shown in FIG. 5, and other functions may be implemented by the processing circuit 33 shown in FIG. 6.

Figure 7A:
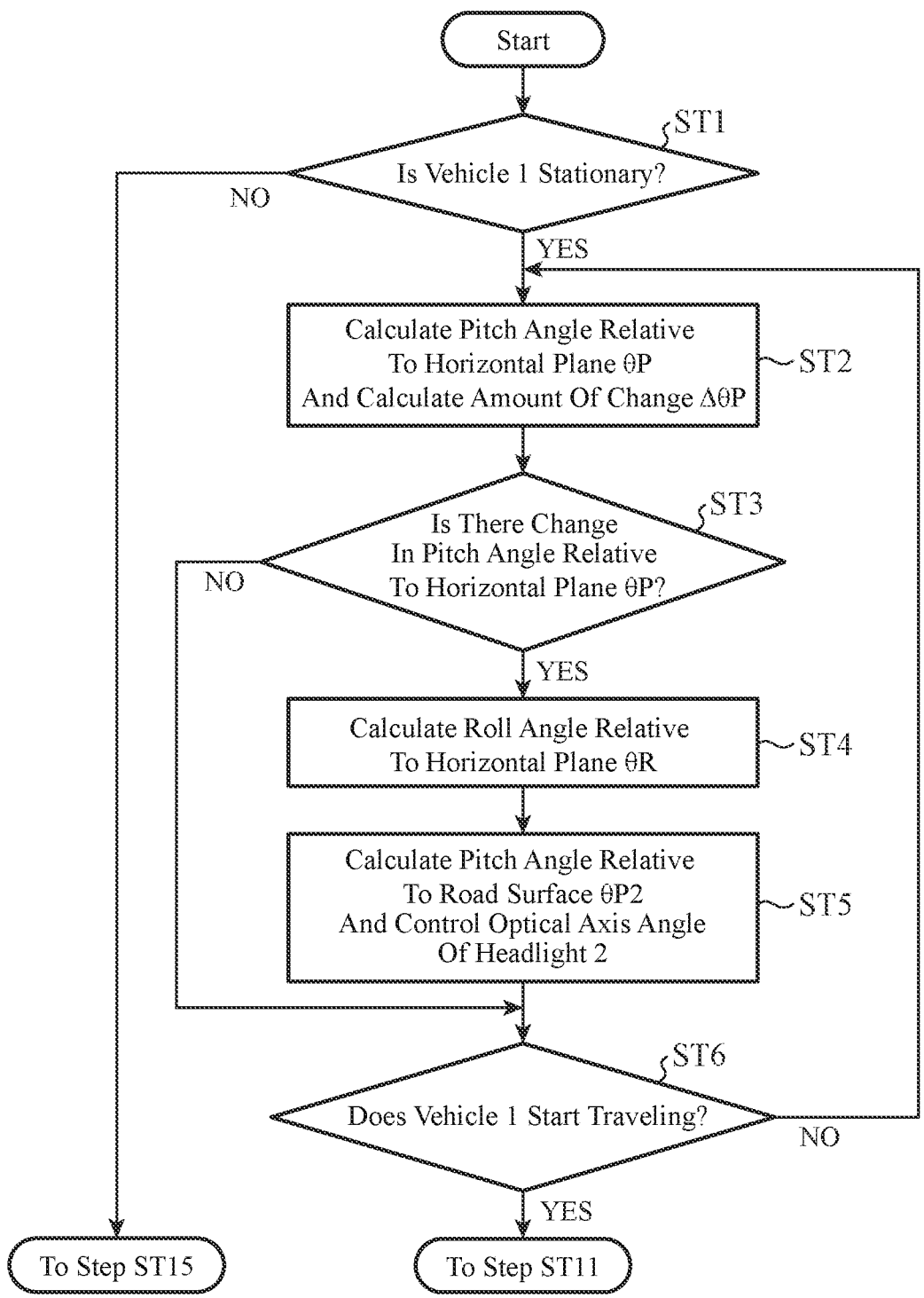
FIG. 7A is a flowchart showing the operation of the optical axis control apparatus according to Embodiment 1 in the present disclosure.
Figure 7B:
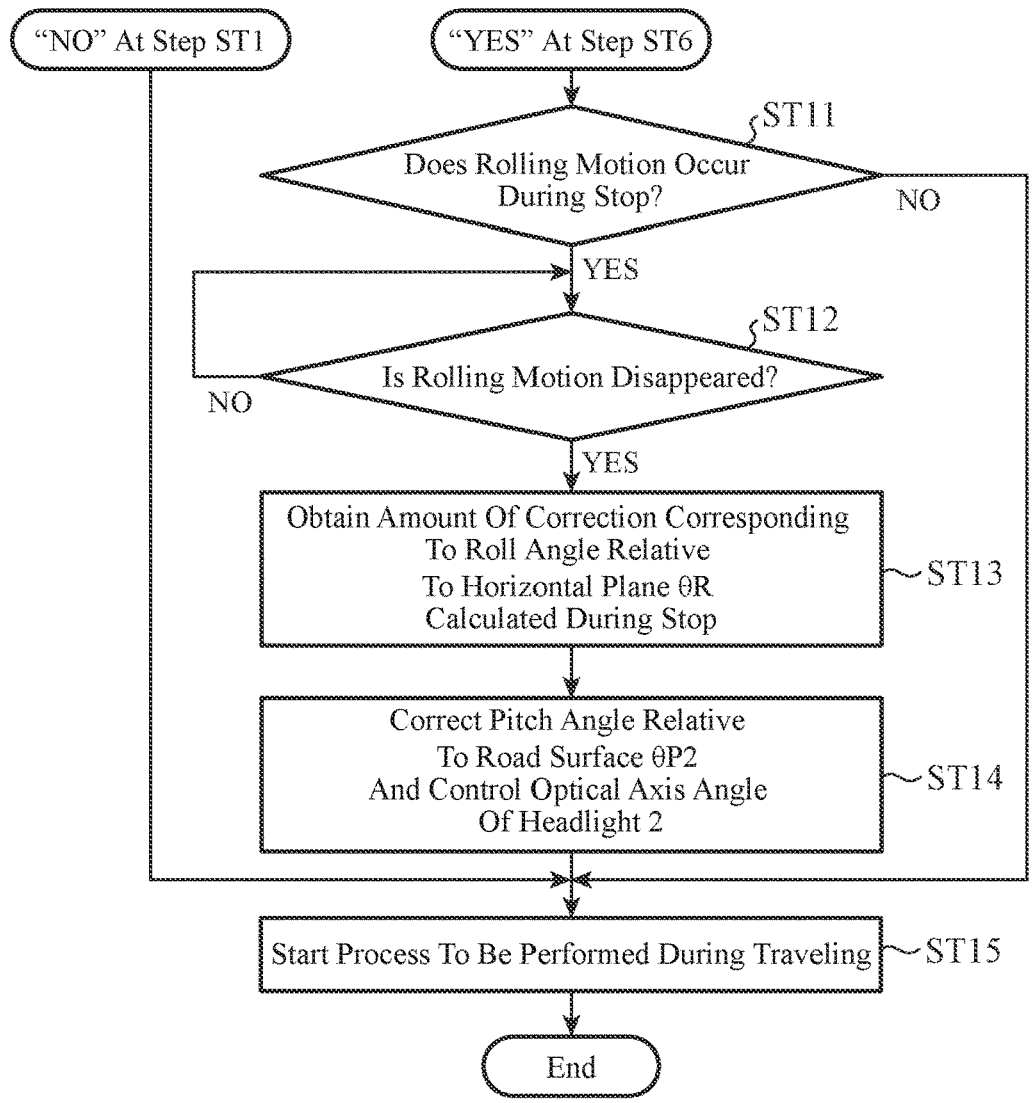
FIG. 7B is a flowchart showing the operation of the optical axis control apparatus according to Embodiment 1 in the present disclosure.

Next, for the operation of the optical axis control apparatus 100, the operation of the optical axis controlling unit 12 will be mainly described with reference to flowcharts of FIG. 7. Namely, a flowchart of FIG. 7A is for a process to be performed during stop, and a flowchart of FIG. 7B is for a correction process. The acceleration sensor 4 repeatedly performs a process of substantially simultaneously detecting accelerations Gx, Gy, and Gz in three directions and outputting these detected values to the rolling motion determination unit 11 and the optical axis controlling unit 12, at predetermined time intervals.

First, at step ST1, the optical axis controlling unit 12 determines whether the vehicle 1 is stationary, using a vehicle speed signal inputted from the vehicle speed sensor 3.

If the vehicle 1 is stationary ("YES" at step ST1), then the optical axis controlling unit 12 calculates a pitch angle relative to horizontal plane θP at step ST2, using the latest accelerations Gx and Gz inputted from the acceleration sensor 4. In addition, the optical axis controlling unit 12 calculates the amount of change ΔθP between two most recently calculated pitch angles relative to horizontal plane θP.

Next, at step ST3, the optical axis controlling unit 12 determines whether there is a change in pitch angle relative to horizontal plane θP, using the amount of change ΔθP calculated at step ST2. If there is a change in pitch angle relative to horizontal plane θP ("YES" at step ST3), then the optical axis controlling unit 12 instructs the rolling motion determination unit 11 to calculate a roll angle relative to horizontal plane θR.

Next, at step ST4, the rolling motion determination unit 11 calculates a roll angle relative to horizontal plane θR, using the latest accelerations Gy and Gz inputted from the acceleration sensor 4. The rolling motion determination unit 11 temporarily stores the calculated roll angle relative to horizontal plane θR in the memory 32, etc.

Next, at step ST5, the optical axis controlling unit 12 calculates a pitch angle relative to road surface θP2, using the amount of change ΔθP calculated at step ST2. Specifically, the optical axis controlling unit 12 adds the amount of change ΔθP to a pitch angle relative to road surface θP that is calculated last time, and thereby calculates a new pitch angle relative to road surface θP2. The optical axis controlling unit 12 controls the optical axis angles of the headlights 2 on the basis of the new pitch angle relative to road surface θP2.

Next, at step ST6, the optical axis controlling unit 12 determines whether the vehicle 1 starts traveling, using a vehicle speed signal inputted from the vehicle speed sensor 3. If the vehicle 1 is still stationary ("NO" at step ST6), then the optical axis controlling unit 12 returns its process to step ST2.

On the other hand, if the vehicle 1 starts traveling ("YES" at step ST6), then the optical axis controlling unit 12 obtains at step ST11 a determination result obtained by the rolling motion determination unit 11. If there is a rolling motion during the stop of the vehicle 1 ("YES" at step ST11), then the optical axis controlling unit 12 calculates at step ST12 a roll angle relative to horizontal plane θR, using the latest accelerations Gy and Gz inputted form the acceleration sensor 4. The optical axis controlling unit 12 determines whether the rolling motion of the vehicle 1 disappears, using the calculated roll angle relative to horizontal plane θR. The optical axis controlling unit 12 repeatedly performs a process of calculating a roll angle relative to horizontal plane θR ("NO" at step ST12) until the rolling motion of the vehicle 1 disappears.

If the rolling motion of the vehicle 1 disappears ("YES" at step ST12), then the optical axis controlling unit 12 obtains at step ST13 the roll angle relative to horizontal plane θR that is calculated by the rolling motion determination unit 11 during the stop of the vehicle 1. Note that if the rolling motion determination unit 11 calculates a roll angle relative to horizontal plane θR a plurality of times during the stop of the vehicle 1, then the optical axis controlling unit 12 obtains, for example, the roll angle relative to horizontal plane θR that is calculated by the rolling motion determination unit 11 last. The optical axis controlling unit 12 obtains an amount of correction θC corresponding to the roll angle relative to horizontal plane θR that is obtained from the rolling motion determination unit 11, among the amounts of correction θC stored in the correction amount storing unit 13.

Next, at step ST14, the optical axis controlling unit 12 corrects the pitch angle relative to road surface θP2 that is calculated last in the process to be performed during stop, using the amount of correction θC obtained at step ST13. Namely, if there is a change in pitch angle relative to road surface θP2 during the stop of the vehicle 1, the changed pitch angle relative to road surface θP2 is an object to be corrected. Specifically, for example, the optical axis controlling unit 12 adds the amount of correction θC obtained at step ST13 to the pitch angle relative to road surface θP2 calculated at the recent step ST5. The optical axis controlling unit 12 controls the optical axis angles of the headlights 2 on the basis of the pitch angle relative to road surface θP2 as corrected.

Next, at step ST15, the optical axis controlling unit 12 starts a process to be performed during traveling.

Note that if the vehicle 1 is traveling ("NO" at step ST1), then the optical axis controlling unit 12 proceeds to step ST15 and starts a process to be performed during traveling. In addition, if the vehicle 1 starts traveling, and if there is no rolling motion during the stop of the vehicle 1 ("NO" at step ST11), then the optical axis controlling unit 12 proceeds to step ST15 and starts a process to be performed during traveling.

Next, with reference to FIGS. 8 to 12, advantageous effects, etc., of the optical axis control apparatus 100 will be described. Each wheel portion of the vehicle 1 is provided with a suspension device, which is not shown. A suspension device provided in a right front wheel portion or a right rear wheel portion of the vehicle 1 may be hereinafter collectively referred to as "right suspension device", and a suspension device provided in a left front wheel portion or a left rear wheel portion of the vehicle 1 may be hereinafter collectively referred to as "left suspension device".

Figure 8:
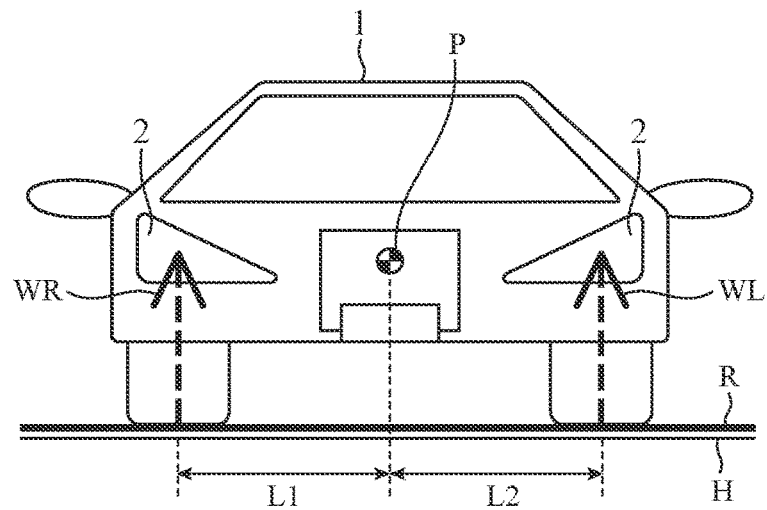
FIG. 8 is an illustrative diagram showing an example of a state in which there is no rolling motion during stop of a vehicle.

FIG. 8 shows a state in which a road surface R is substantially parallel to a horizontal plane H, and in which there is no rolling motion during stop of the vehicle 1. In the drawing, P indicates the center of gravity of the vehicle 1. L1 indicates a distance between the center of gravity P and the right front wheel portion along the horizontal plane, and L2 indicates a distance between the center of gravity P and the left front wheel portion along the horizontal plane.

Of load W applied to the front wheel portions of the vehicle 1, a load WR applied to a right suspension device provided in the right front wheel portion is represented by Equation (4) below. In addition, a load WL applied to a left suspension device provided in the left front wheel portion is represented by Equation (5) below.

$$WR = W \times \{L2/(L1+L2)\} \quad (4)$$

$$WL = W \times \{L1/(L1+L2)\} \quad (5)$$

In the example of FIG. 8, because L1=L2, WR=W/2 and WL=W/2 according to Eqs. (4) and (5). Namely, the load WR applied to the right suspension device provided in the right front wheel portion and the load WL applied to the left suspension device provided in the left front wheel portion have equal values.

Figure 9:
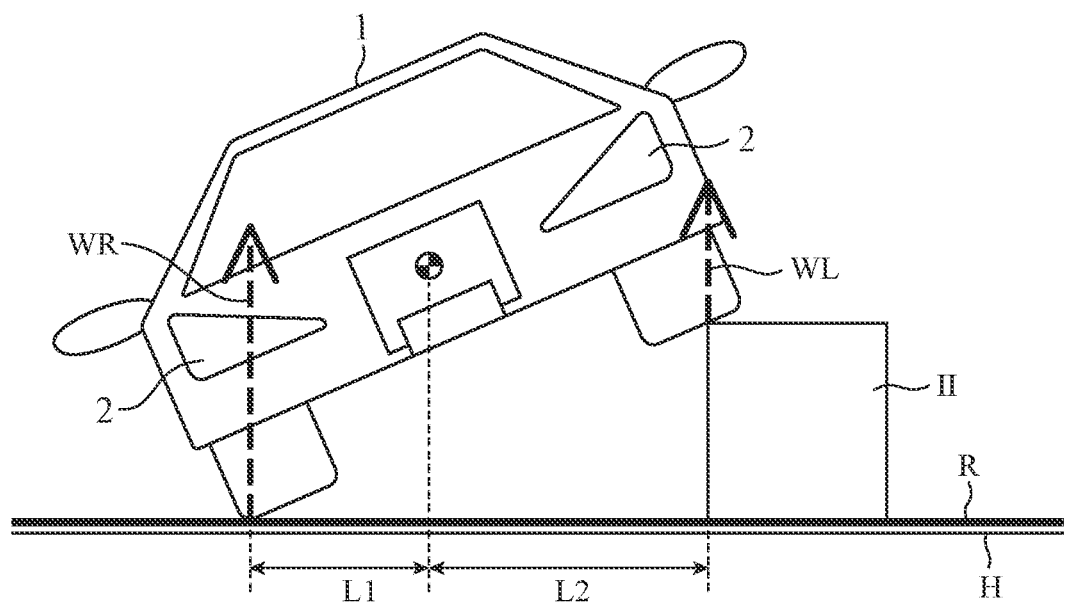
FIG. 9 is an illustrative diagram showing an example of a state in which there is a rolling motion during stop of the vehicle.

On the other hand, FIG. 9 shows a state in which there is a rolling motion during stop of the vehicle 1. Specifically, a state is shown in which the left front wheel portion runs over a curb II. In the example of FIG. 9, because L1<L2, WR>W/2 and WL<W/2 according to Eqs. (4) and (5). Namely, the load WR applied to the right suspension device provided in the right front wheel portion and the load WL applied to the left suspension device provided in the left front wheel portion have different values. At this time, a difference value between WR and WL is determined based on a difference value between L1 and L2, and is determined based on the value of the roll angle, the position of the center of gravity P of the vehicle 1, and the like.

In addition, loads applied to a right suspension device and a left suspension device provided in rear wheel portions of the vehicle 1 are also the same as those in the examples shown in FIGS. 8 and 9. As such, for the total weight of the vehicle 1 including passengers, baggage, etc., the loads applied to the suspension devices provided in the respective wheel portions of the vehicle 1 have different values depending on the value of the roll angle, the position of the center of gravity P of the vehicle 1, and the like.

Figure 10:
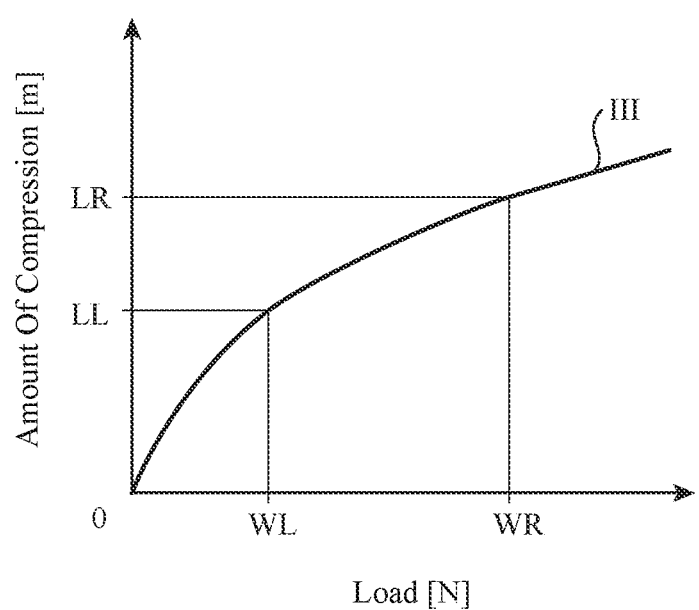
FIG. 10 is a characteristic diagram showing the amount of compression of a suspension device with respect to a load applied to the suspension device.

Here, FIG. 10 is an example of a characteristic diagram showing the amount of compression of each suspension device provided in the vehicle 1 with respect to a load applied to the suspension device. As shown in FIG. 10, the slope of a characteristic line III representing the amount of compression with respect to the load is not constant, and the characteristic (hereinafter, simply referred to as "characteristic") is nonlinear. For example, the amount of compression LR for the load WR in the example of FIG. 9 has a larger value than the amount of compression LL for the load WL in the example of FIG. 9.

Figure 11:
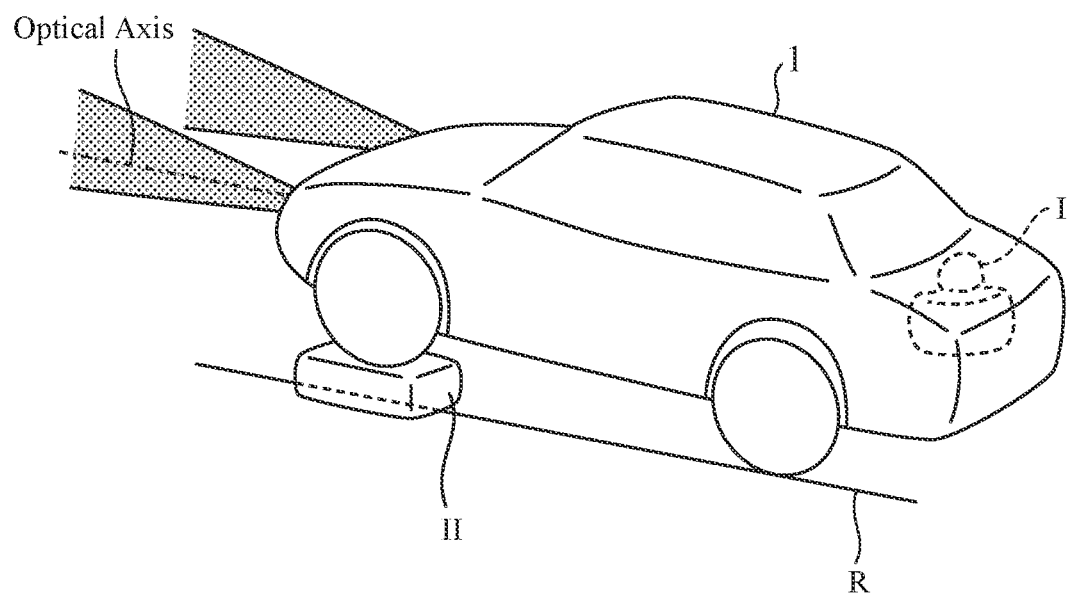
FIG. 11 is an illustrative diagram showing a state in which a rolling motion occurs due to a left front wheel portion running over a curb during stop of the vehicle.
Figure 12:
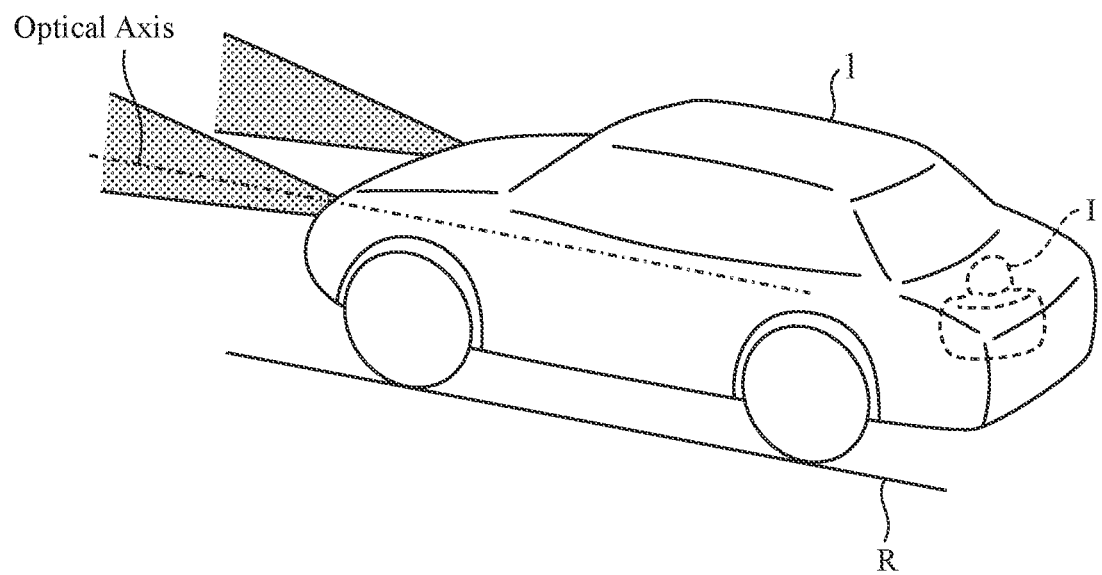
FIG. 12 is an illustrative diagram showing a state in which the vehicle starts traveling and the rolling motion shown in FIG. 11 disappears.

By the above, the amounts of stretch or compression of the respective suspension devices for when the rolling motion of the vehicle 1 disappears have different values depending on the loads applied to the individual suspension devices in the state of rolling motion. In addition, the loads have different values depending on the value of roll angle, the position of the center of gravity P of the vehicle 1, and the like. Therefore, the amount of change in pitch angle for when the rolling motion of the vehicle 1 disappears also has different values depending on the value of the roll angle and the position of the center of gravity P of the vehicle 1. In other words, the amount of change in pitch angle for when the piece of baggage I is loaded in the trunk provided at the rear of the vehicle 1 has different values for a state in which a rolling motion has occurred due to the left front wheel portion running over a curb II as shown in FIG. 11, and for a state in which there is no such rolling motion as shown in FIG. 12.

Here, in general, the position of the center of gravity P of the vehicle 1 varies depending on the type of the vehicle 1. The amounts of correction θC exemplified in FIG. 4 have values that are set taking into account the position of the center of gravity P for each vehicle type. Namely, the amounts of correction θC are set to values for each roll angle and each vehicle type that can correct the amount of change in pitch angle that depends on the amount of stretch or compression of each suspension device upon termination of a rolling motion.

Note that the amounts of correction θC shown in FIG. 4 are an example of the amounts of correction θC set for each vehicle type, and the amounts of correction θC are not limited thereto. For example, vehicle types are not limited to three vehicle types, minivans, passenger cars other than minivans, and trucks, and the setting may be performed for any vehicle type. In addition, the unit of angle is not limited to degree (°), and any unit may be set in accordance with equations used to calculate each angle by the optical axis controlling unit 12. In addition, the positive and negative angle values for the pitch direction and the positive and negative angle values for the roll direction may be set in any manner in accordance with the processing operations of the optical axis controlling unit 12, etc.

In addition, the range of roll angles relative to horizontal plane θR for which the amount of correction θC is set is not limited to −3° to +3°, and may be set to any range. In addition, the amounts of correction θC are not limited to being set on a per degree basis for the roll angle relative to horizontal plane θR, and may be set on an "any degree" basis.

In addition, when the vehicle type of the vehicle 1 has already been determined when manufacturing the optical axis control apparatus 100, the correction amount storing unit 13 may store only those amounts of correction θC appropriate to the vehicle type. By this, the volume of data for the amounts of correction θC stored in the correction amount storing unit 13 can be reduced. In addition, when the vehicle type of the vehicle 1 has not been determined yet when manufacturing optical axis control apparatus 100, the correction amount storing unit 13 may store the amounts of correction θC appropriate to each vehicle type, and when manufacturing the vehicle 1, which ones of those amounts of correction θC are to be used may be set in the optical axis controlling unit 12.

In addition, the position of the center of gravity P of the vehicle 1 also varies depending on the position of the trunk in the up-down direction of the vehicle 1. The amounts of correction θC may be set for each position of the trunk in the up-down direction of the vehicle 1, instead of being set for each vehicle type of the vehicle 1. Alternatively, the setting may be performed for each vehicle type of the vehicle 1 and for each position of the trunk in the up-down direction of the vehicle 1.

In addition to the above, the amounts of correction θC may be set based on any parameter as long as the amounts of correction θC have values determined based on loads applied, by rolling motion, to the respective suspension devices provided in the respective wheel portions of the vehicle 1. By increasing types of parameters to be taken into account in setting the amounts of correction θC, the accuracy of correction can be further increased.

Furthermore, it is more preferred that taking into account a component of an acceleration Gy included in a pitch angle which is calculated based on accelerations Gx and Gz, in addition to the amount of change in pitch angle that depends on the stretch or compression of the suspension devices upon termination of rolling motion, the amounts of correction θC be set to values that correct both the amount of change and the component. By this, the accuracy of correction can be further increased.

In addition, although Embodiment 1 shows an example in which the rolling motion determination unit 11 calculates a roll angle relative to horizontal plane θR and determines whether there is a rolling motion, using the roll angle relative to horizontal plane θR, when a roll angle relative to road surface can be calculated using output values from the acceleration sensor 4, the rolling motion determination unit 11 may calculate a roll angle relative to road surface and determine whether there is a rolling motion, using the roll angle relative to road surface. In this case, likewise, the optical axis controlling unit 12 may detect disappearance of rolling motion by calculating a roll angle relative to road surface, and correct a pitch angle relative to road surface θP2, using the amounts of correction θC set for each roll angle relative to road surface.

In addition, a method for calculating a pitch angle relative to road surface θP2 in a process to be performed during traveling performed by the optical axis controlling unit 12 is not limited to the above-described method using the amount of change ΔθP in pitch angle relative to horizontal plane θP. In the process to be performed during traveling, the optical axis controlling unit 12 may, for example, calculate a pitch angle relative to road surface θP2 without calculating a pitch angle relative to horizontal plane θP, by the following method.

Specifically, the optical axis controlling unit 12 calculates, using Equation (6) below, the amount of change ΔGz between accelerations Gz1 and Gz2 in the up-down direction which are detected at two different time points by the acceleration sensor 4. The one acceleration Gz1 is, for example, a value detected upon the most recent stop or upon the most recent traveling at a constant speed. The other acceleration Gz2 is, for example, the latest value detected upon the most recent acceleration or upon the most recent deceleration. In addition, the optical axis controlling unit 12 calculates, using Equation (7) below, the amount of change ΔGx between accelerations Gx1 and Gx2 in the front-rear direction which are detected at the two different time points. The optical axis controlling unit 12 calculates a pitch angle relative to road surface θP2 by using Equation (8) below.

$$\Delta Gz = Gz2 - Gz1 \quad (6)$$

$$\Delta Gx = Gx2 - Gx1 \quad (7)$$

$$\theta P2 = \tan^{-1}(\Delta Gz/\Delta Gx) \quad (8)$$

In addition, the optical axis controlling unit 12 may not perform the calculation of a pitch angle relative to road surface θP2 and the control of optical axis angles in a process to be performed during traveling. Namely, in general, there is a high probability that passengers' getting in or out of the vehicle 1 or loading or unloading of baggage into/from the vehicle 1 is performed during stop of the vehicle 1, and there is a low probability that such action is taken during traveling of the vehicle 1. Therefore, when a pitch angle has been changed during traveling of the vehicle 1, there is a possibility that the change is not made by passengers' getting in or out or loading or unloading of baggage, and thus it is a change that should be excluded from a target of optical axis control. Hence, the calculation of a pitch angle relative to road surface θP2 and the control of optical axis angles may be performed only in a process to be performed during stop and a correction process, by which the processing load of the optical axis control apparatus 100 may be further reduced.

In addition, the optical axis controlling unit may perform a correction process only when a pitch angle has been changed during stop of the vehicle 1. Namely, in a case in which there has been no change in pitch angle during stop of the vehicle 1, when the vehicle 1 has started traveling, the optical axis controlling unit 12 starts a process to be performed during traveling without performing a correction process. By this, when there has been no loading of baggage or the like during stop of the vehicle 1, performing an unnecessary correction process can be prevented. As a result, the processing load of the optical axis control apparatus 100 can be further reduced.

In addition, a configuration may be such that only accelerations Gx and Gz are detected using a so-called "2-axis" acceleration sensor as the acceleration sensor 4, and a load sensor that detects a load applied to each of the suspension devices provided in the respective wheel portions is added. In this case, for example, calculation of a pitch angle may use output values from the acceleration sensor 4, and calculation of a roll angle and a determination as to whether there is a rolling motion may use output values from the load sensor. However, in terms of a reduction in the cost of the vehicle 1, it is preferred that the load sensor be removed and calculation of a roll angle and a determination as to whether there is a rolling motion also use output values from the acceleration sensor 4.

In addition, the vehicle 1 may include a sensor that detects a shift position of a transmission and outputs a signal indicating the detected shift position, a so-called "shift position signal". In this case, the optical axis controlling unit 12 may perform a determination as to whether the vehicle 1 is stopped and a determination as to whether the vehicle 1 has started traveling, using a shift position signal instead of or in addition to a vehicle speed signal.

In addition, the acceleration sensor 4 may be included in the optical axis control apparatus 100. By integrally forming the acceleration sensor 4 and the optical axis control apparatus 100, a wire harness that connects the acceleration sensor 4 to the optical axis control apparatus 100 becomes unnecessary, by which the structure of the vehicle 1 is simplified, enabling to reduce the manufacturing cost of the vehicle 1.

In addition, the optical axis control apparatus 100 may be integrally formed with a control device that performs control different than the optical axis control of the headlights 2. By integrally forming the optical axis control apparatus 100 and another control device, the number of electronic devices mounted on the vehicle 1 is reduced, enabling to reduce the manufacturing cost of the vehicle 1.

As described above, the optical axis control apparatus 100 of Embodiment 1 includes the optical axis controlling unit 12 that calculates a pitch angle using output values from the acceleration sensor 4 provided in the vehicle 1 and controls, using the pitch angle, the optical axis angles of the headlights 2 provided in the vehicle 1, during stop of the vehicle 1; and the rolling motion determination unit 11 that determines, when the vehicle 1 starts traveling, whether a rolling motion occurs during the stop of the vehicle 1. When the pitch angle is changed during the stop of the vehicle 1 and the rolling motion determination unit 11 determines that the rolling motion exists, the optical axis controlling unit 12 corrects, upon disappearance of the rolling motion, the changed pitch angle, i.e., the amount of change in pitch angle, using the amount of correction θC set for each roll angle during stop of the vehicle 1, and controls the optical axis angles using the corrected pitch angle. By setting the amount of correction θC for each roll angle, it becomes possible to correct the amount of change in pitch angle that depends on the amounts of stretch or compression of the suspension devices upon termination of rolling motion, etc. In addition, in contrast to a configuration in which the amount of correction is calculated regardless of whether there is a rolling motion as in the control device of Patent Literature 2, processing load can be significantly reduced while a pitch angle is corrected with high accuracy.

In addition, the acceleration sensor 4 is to detect an acceleration Gx in the front-rear direction of the vehicle 1, an acceleration Gy in the left-right direction of the vehicle 1, and an acceleration Gz in the up-down direction of the vehicle 1, and the rolling motion determination unit 11 determines whether the rolling motion exists, using output values from the acceleration sensor 4. By using a 3-axis acceleration sensor as the acceleration sensor 4, the need for a load sensor, etc., used to calculate a roll angle and to determine whether there is rolling motion can be eliminated. As a result, the cost of the vehicle 1 can be reduced.

In addition, the amounts of correction θC are prestored in a table-format data structure. By this, an amount of correction θC for each roll angle can be prestored. In addition, by setting the amount of correction θC to an appropriate value based on the load applied, by rolling motion, to each of the right suspension device and the left suspension device, etc., while, as described above, calculation of the amount of correction becomes unnecessary and thus processing load is reduced, a pitch angle can be corrected with high accuracy.

In addition, the amounts of correction θC are set to values based on loads applied to each of the right suspension device and left suspension device provided in the vehicle 1. The amount of change in pitch angle for when rolling motion of the vehicle 1 has been terminated varies depending on the amount of stretch or compression of each suspension device, and the amount of stretch or compression of each suspension device obtained at this time varies depending on the load applied to each suspension device. Namely, by setting the amounts of correction θC to values based on loads applied to the respective suspension devices in a state of rolling motion, the amount of change in pitch angle that depends on the amount of stretch or compression of each suspension device upon termination of rolling motion can be corrected.

In addition, the values of the amounts of correction θC are set based on the position of the trunk in the up-down direction of the vehicle 1. In general, the amounts of stretch or compression of the suspension devices upon termination of rolling motion vary depending on loads applied to the respective suspension devices in a state of rolling motion, the loads vary depending on the position of the center of gravity P of the vehicle 1, and the position varies depending on the position of the trunk in the up-down direction of the vehicle 1. Namely, by setting the amounts of correction θC based on the position of the trunk in the up-down direction of the vehicle 1, the amounts of correction θC can be set to values based on loads applied, by rolling motion, to each of the right suspension device and the left suspension device. In addition, by a configuration in which such amounts of correction θC are prestored in a table-format data structure, the amount of data for the amounts of correction θC is reduced by storing only those amounts of correction θC appropriate to the trunk position of a vehicle 1 on which the optical axis control apparatus 100 is actually mounted, or a plurality of vehicle types of vehicles 1 can be supported by storing those amounts of correction θC appropriate to the trunk positions of the respective plurality of vehicle types of vehicles 1, and accordingly, a flexible configuration according to required specifications, etc., can be implemented.

In addition, the values of the amounts of correction θC are set based on the vehicle type of the vehicle 1. In general, the position of the center of gravity P of the vehicle 1 varies depending on the vehicle type of the vehicle 1. Namely, by setting the amounts of correction θC based on the vehicle type of the vehicle 1, the amounts of correction θC can be set to values based on loads applied, by rolling motion, to each of the right suspension device and the left suspension device. In addition, by a configuration in which such amounts of correction θC are prestored in a table-format data structure, the amount of data for the amounts of correction θC is reduced by storing only those amounts of correction θC appropriate to the vehicle type of a vehicle 1 on which the optical axis control apparatus 100 is actually mounted, or a plurality of vehicle types of vehicles 1 can be supported by storing those amounts of correction θC appropriate to each of the plurality of vehicle types of vehicles 1, and accordingly, a flexible configuration according to required specifications, etc., can be implemented.

Note that modifications to any component in the embodiment or omissions of any component in the embodiment is possible within the scope of the invention.

INDUSTRIAL APPLICABILITY

An optical axis control apparatus for headlight according to this disclosure can be used for optical axis control of headlights.

REFERENCE SIGNS LIST

1: Vehicle, 2: Headlight, 3: Vehicle speed sensor, 4: Acceleration sensor, 11: Rolling motion determination unit, 12: Optical axis controlling unit, 13: Correction amount storing unit, 21: Actuator, 31: Processor, 32: Memory, 33: Processing circuit, and 100: Optical axis control apparatus.

The invention claimed is:

1. An optical axis control apparatus for headlight, the apparatus comprising:
processing circuitry
to calculate, during stop of the vehicle, a pitch angle by using output values from an acceleration sensor provided for a vehicle, and control an optical axis angle of a headlight provided for the vehicle by using the pitch angle; and
to determine, when the vehicle starts traveling, whether there is a rolling motion during the stop of the vehicle, wherein
an amount of correction for each roll angle is prestored in the processing circuitry,
when the pitch angle is changed during the stop of the vehicle and the processing circuitry determines an existence of the rolling motion, the processing circuitry performs a correction process of correcting, upon disappearance of the rolling motion, the changed pitch angle by using the amount of correction for each roll angle, and controls the optical axis angle by using the corrected pitch angle; and
when the pitch angle is not changed during the stop of the vehicle, performs no correction process.

2. The optical axis control apparatus for headlight according to claim 1, wherein
the acceleration sensor is configured to detect an acceleration in a front-rear direction of the vehicle, an acceleration in a left-right direction of the vehicle, and an acceleration in an up-down direction of the vehicle, and
the processing circuitry determines whether the rolling motion exists using the output values from the acceleration sensor.

3. The optical axis control apparatus for headlight according to claim 1, wherein the amount of correction is prestored in a table-format data structure.

4. The optical axis control apparatus for headlight according to claim 1, wherein the amount of correction is set to a value determined based on a load applied to each of a right suspension device and a left suspension device provided for the vehicle.

5. The optical axis control apparatus for headlight according to claim 4, wherein the value of the amount of correction is set based on a position of a trunk in an up-down direction of the vehicle.

6. The optical axis control apparatus for headlight according to claim 4, wherein the value of the amount of correction is set based on a type of the vehicle.

* * * * *